July 23, 1963 E. G. HAMMER, JR., ET AL 3,098,956
ELECTRICAL CAPACITOR
Filed June 13, 1960 3 Sheets-Sheet 1
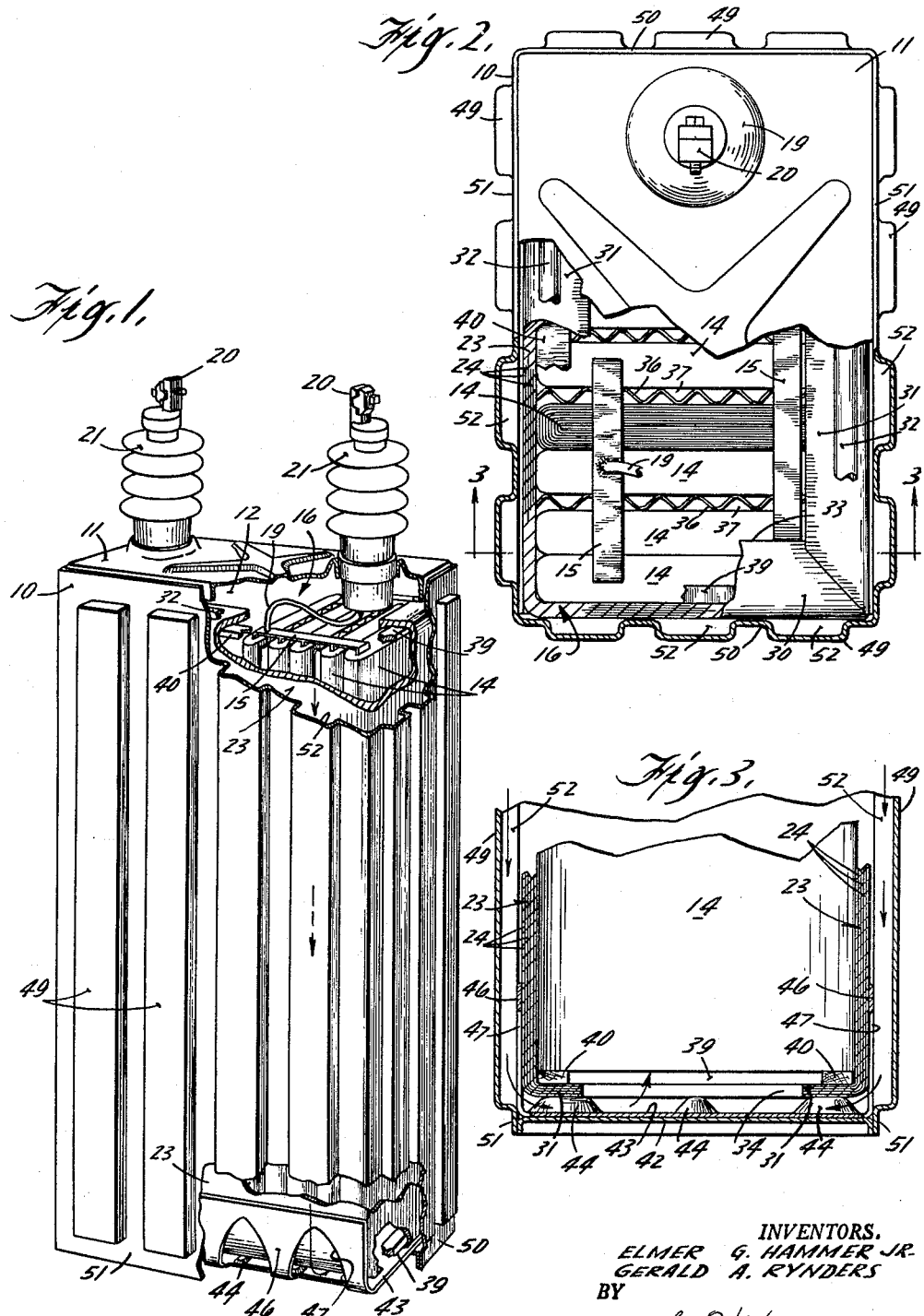
INVENTORS.
ELMER G. HAMMER JR.
GERALD A. RYNDERS
BY
Lee H. Kaiser
ATTORNEY.

July 23, 1963    E. G. HAMMER, JR., ET AL    3,098,956
ELECTRICAL CAPACITOR
Filed June 13, 1960    3 Sheets-Sheet 2
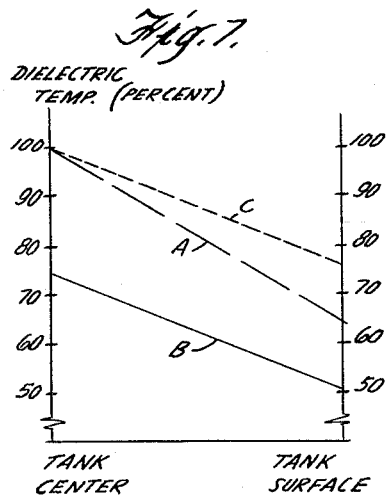
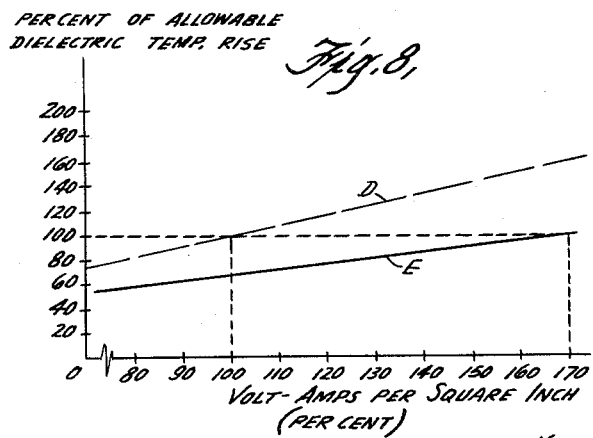
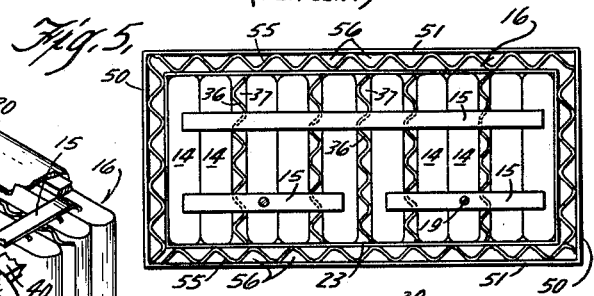
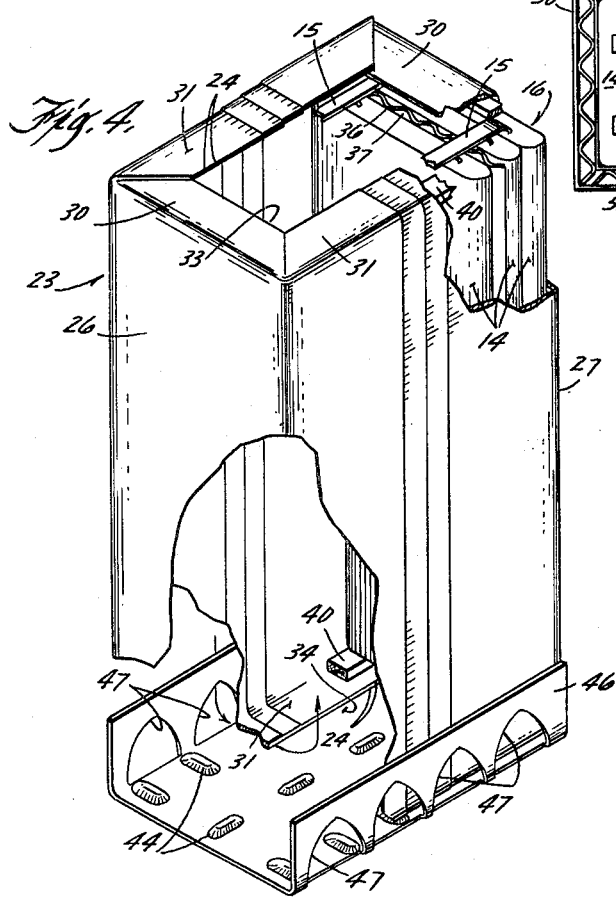
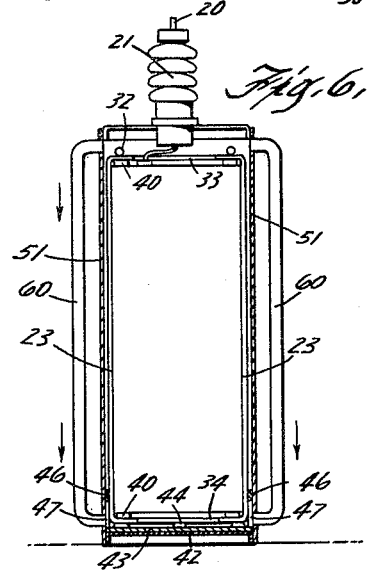
INVENTORS.
ELMER G. HAMMER JR.
GERALD A. RYNDERS
BY
Lee H. Kaiser
ATTORNEY.

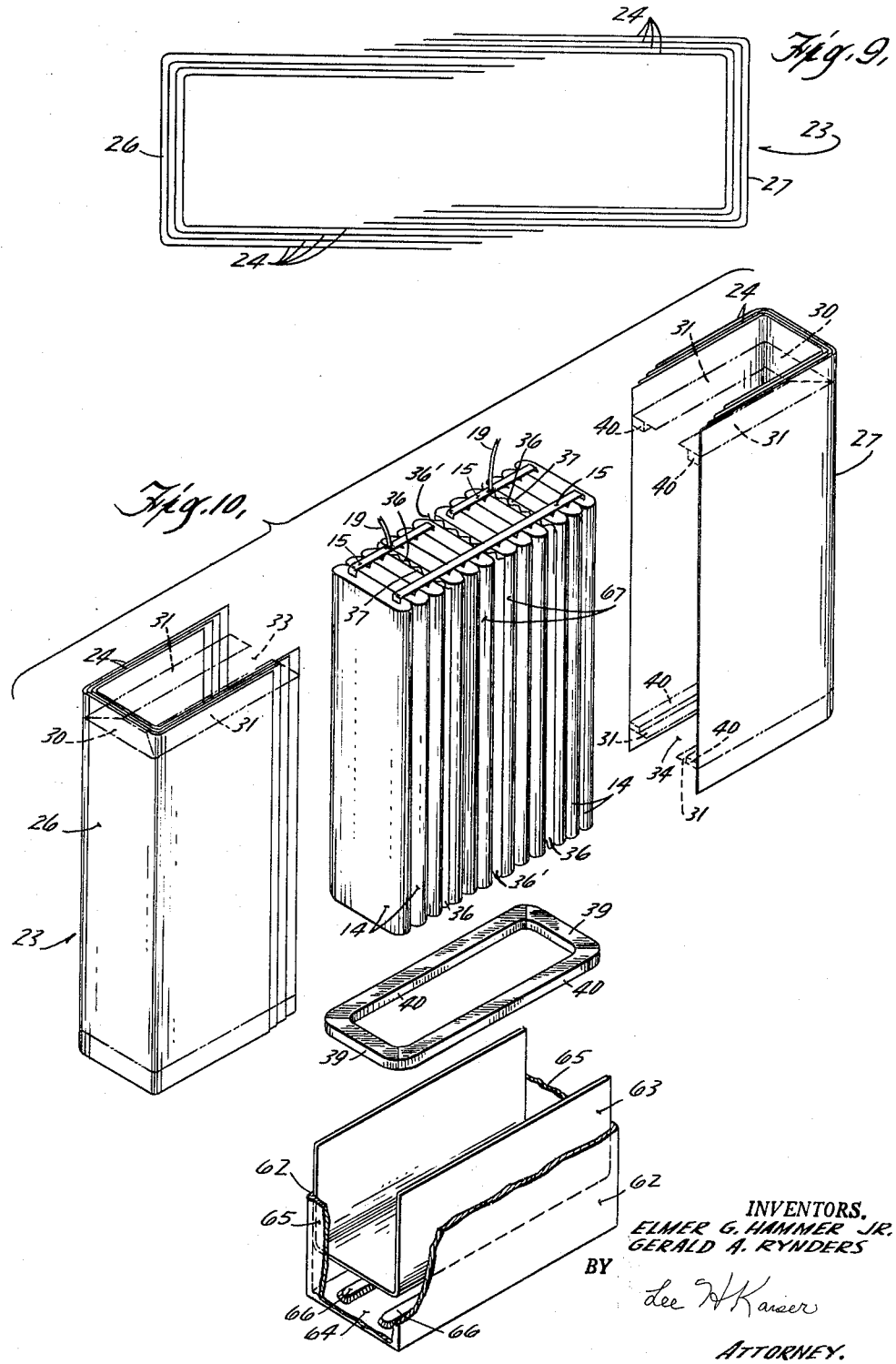

3,098,956
ELECTRICAL CAPACITOR

Elmer G. Hammer, Jr., and Gerald A. Rynders, Milwaukee, Wis., assignors to McGraw-Edison Company, Milwaukee, Wis., a corporation of Delaware
Filed June 13, 1960, Ser. No. 35,501
10 Claims. (Cl. 317—243)

This invention relates to power factor correcting capacitors for electrical power systems.

Power factor correcting capacitors are utilized to improve power factor, reduce line losses, and decrease voltage drop on electrical power transmission and distribution circuits. Conventionally power factor correcting capacitors are connected to a high voltage line either directly in shunt or in series-parallel groups with each group consisting of a number of capacitor units connected in parallel and with the groups connected in series from phase-to-phase or from phase-to-neutral of the transmission or distribution system. Tremendous increases in the use of electrical power have produced high load demands necessitating additional capacitive kilovar on distribution and transmission systems, and in order to meet the increasing requirement for capacitive kilovar, manufacturers of capacitors have increased the rating of individual-capacitor units from 10 to 15 to 25 and then to 50 kilovar. An increase in kilovar rating necessitates a corresponding increase in active material, and consequently the factors of weight per kilovar and volume per kilovar are of prime concern to capacitor manufacturers. Improvements in vacuum drying and impregnating processes and such improvements in material as higher dielectric constant impregnating liquids have resulted in substantial reduction in weight and volume per kilovar.

Construction of power factor correction capacitors has not varied significantly although the kilovar rating has progressively increased. Conventionally a number of capacitor pack sections each composed of wound metallic foil separated by thin sheets of insulating tissue are connected in desired series-parallel arrangement and disposed in a metal tank. The packs are impregnated with a dielectric liquid filling the tank and are isolated from the walls of the metal tank by a "major insulation" envelope.

Although a demand exists for capacitors above 50 kilovar rating, two important considerations have heretofore prevented such construction in units of commercially acceptable size. An increase in kilovar necessitates a proportional increase in active material such as metallic foil and insulating tissue, yet an increase in active material does not result in a proportionate increase in the surface area of the tank. A 50 kilovar capacitor requires twice the quantity of tissue and foil used in a 25 kilovar capacitor, yet doubling the breadth of the tank only increases the total tank surface area by 36 percent and doubling the tank width only increases the surface area 77 percent, and any loss of surface area per kilovar would necessarily increase the operating temperature of the dielectric. Further, the operating stress and temperature imposed on capacitor liquid dielectrics have reached their apparent maximum with the accepted safety factors applied.

It is an object of the invention to provide a capacitor having a greater amount of active material, and thus greater kilovar, per unit tank surface area than prior art constructions without exceeding the allowable dielectric operating temperature.

It is a further object of the invention to provide a power factor correction capacitor which can be constructed in ratings above 50 kilovar without increase in size and weight proportional to such increase in kilovar. Another object is to provide such a capacitor wherein the amount of foil and tissue can be increased to permit kilovar ratings above fifty kilovars without increasing the tank surface area in proportion of such increase in active material.

A still further object of the invention is to provide a capacitor having greatly reduced thermal gradient across the major electrical insulation in comparison to prior art constructions. Still another object of the invention is to provide a 100 kilovar capacitor which meets the standard mounting dimension of the national Electrical Manufacturers Association for 50 kilovar and smaller units without an increase in the hot spot temperature above that of 50 kilovar units of conventional constructions.

Another object of the invention is to provide an improved capacitor construction which can withstand higher internal pressure, and thus is easier to protect by fuses, than a conventional capacitor unit. A further object of the invention is to provide such improved capacitor construction which will permit use of conventional expulsion protective fuses in systems which have high fault current and thus require expensive current limiting protective fuses for conventional capacitors.

An object of one embodiment of the invention is to provide an improved construction applicable to capacitors of 50 kilovars and lower ratings wherein the hot spot temperature of the packs and the thermal gradient across the major insulation envelope is materially lower than in prior art capacitors.

We have found that conventional capacitors have the disadvantage that the heat generated in the dielectric materials by the inherent losses of these materials is restricted in its flow to the heat dissipating surfaces and that the thermal barrier provided by the major insulation causes a high thermal gradient between the hot spot of the capacitor packs and the tank sidewall operating temperatures. In accordance with the invention means are provided to remove the undesirable heat from the dielectric material and transfer it to the heat dissipating tank surfaces. In the preferred embodiment of the invention the major insulation envelope is open at both the top and bottom of the pack assembly, channels are provided within the major insulation envelope for vertical circulation of the insulating dielectric in heat transfer relation with the packs, and ducts isolated from the heat source and at least partially defined by the heat radiating tank surface are provided external of the major insulation envelope to permit convection flow of the insulating dielectric in heat transfer relation with the packs and with the heat radiating surface of the tank. Reservoirs of liquid dielectric are provided above and below the major insulation envelope, and the hot insulating dielectric in the external cooling ducts is isolated from the heat source by the major electrical insulation, thereby providing large heat dissipating area per unit volume of liquid and resulting in effective heat transfer to the atmosphere as the liquid dielectric cools and flows downward in the external ducts into the lower reservoir from whence it flows upward through the internal channels and over the surfaces of the capacitor packs.

These and other objects and advantages of the invention will be more apparent from the following detailed description when taken in conjunction with the accompanying drawing wherein:

FIG. 1 is a perspective view of a preferred embodiment of the invention with a portion of the metallic casing and major insulation envelope broken away to better illustrate the arrangement of the components;

FIG. 2 is a top view of the embodiment of FIG. 1 with a portion of the cover and the major insulation envelope broken away;

FIG. 3 is a partial cross section view taken along lines 3—3 of FIG. 2;

FIG. 4 is a perspective view of the major insulation envelope and the insulating member disposed against the bottom of the casing of the embodiment of FIG. 1;

FIG. 5 is a horizontal cross sectional view through an alternative embodiment of the invention;

FIG. 6 is a vertical cross sectional view through a still further embodiment of the invention;

FIG. 7 is a curve showing the temperature gradient from the center pack section to the tank sidewall of the embodiment of FIG. 1 in comparison to prior art construction;

FIG. 8 is a graph illustrating the kilovar output per square inch of tank radiating surface for the capacitor of the invention in comparison to conventional construction;

FIG. 9 is a horizontal view through the major insulation envelope; and

FIG. 10 is an exploded perspective view of another embodiment of the invention.

Referring to the drawing, the preferred embodiment of the capacitor of the invention is contained in a metal tank 10 preferably of stainless steel having a metallic cover 11 welded thereto. The tank 10 is generally rectangular and is preferably of welded construction in order to make it leak-proof. The cover 11 fits into the top of the tank 10 to completely close it and is welded in place after the capacitor unit has been assembled so as to seal it against the entrance of moisture or leakage of the dielectric liquid 12 with which the casing 10 is filled.

The capacitor comprises a plurality of individual capacitor packs 14 each preferably wound from metallic foils separated by layers of thin dielectric. Preferably two sheets of aluminum foil separated by sheets of thin kraft paper are wound in cylindrical shape on a mandrel with terminal strips, or electrodes, 15 inserted into the wound structure in contact with the two foils as a means of making external connections to the foils. After winding, the mandrel is removed and the roll is flattened to form a multi-layer, generally rectangular capacitor pack 14.

A plurality of flattened packs 14 positioned in side-by-side relation within the casing 10 comprise a capacitor pack assembly 16. In order to provide the desired capacitance and voltage rating, the capacitor packs 14 are connected in series and parallel relation by connecting the terminal strips 15 together internally of casing 10. For example, in a 2400 volt unit eighteen packs 14 may be assembled within casing 10, and six packs 14 may be connected in parallel and three such paralleled groups wired in series to apply a working voltage to each pack of only 800 volts. In the embodiment of FIG. 1 ten packs 14 assembled within casing 10 are divided into two series-connected groups each of which comprises five paralleled packs. The flexible electrodes 15 are brought together and preferably commoned by spot-welding, and wire leads 19 connect the commoned electrodes to the terminals 20 of porcelain bushings 21 sealed by solder to cover 11.

The capacitor packs 14 are insulated from the tank 10 by the major insulation envelope 23 which comprises a plurality of layers 24 of paper folded to surround the pack assembly 16 and prevent pack-to-ground failures. Preferably the major insulation envelope 23 comprises six layers 24 of pure kraft paper .010 inch in thickness having a vertical dimension greater than that of the packs 14. The sheets 24 of kraft paper are divided into a left-hand group 26 of six sheets folded to have a U-shaped horizontal cross section and a right-hand group 27 of like number also of U-shaped horizontal cross section, although a lesser number of sheets is shown in FIGS. 4, 9, and 10. The U-shaped groups 26 and 27 embrace the pack assembly 16 with their open ends facing each other and the free ends of the sheets 24 appreciably overlapped to assure a complete blanket of insulation around the entire pack assembly 16 which at no point, including the area of overlap, is thinner than six layers of the kraft paper.

In conventional construction six layers of kraft paper are placed above the packs and a like number below the packs to insure a complete six-sided envelope of insulation around the entire pack assembly 16 and thus provide high breakdown strength from packs to tank. A fundamental weakness of such design is the fact that the heat generated in the dielectric materials by the inherent losses of these materials is restricted in its flow to the heat dissipating tank surface, and such thermal barrier formed by the major insulation envelope 23 causes a high thermal gradient between the hot spot and the sidewall operating temperatures. (See curve A of FIG. 7.)

In accordance with the invention the major insulation envelope 23 provided by the layers 24 of kraft paper is open at the top and bottom of the pack assembly 16. The portions 30 of the major insulation sheets 24 which extend above and below the pack assembly 16 along the narrower sides thereof are first folded over horizontally, and the portions 31 of the sheets 24 which extend above and below the pack assembly 16 along the front and back tank walls 51 are then folded horizontally over the portions 30 to provide full thickness of insulation at each corner, a spot that is normally vulnerable to failures from pack to ground. Elongated wooden strips 32 having clips (not shown) at the ends thereof welded to the inner periphery of the tank sidewalls hold the portions 30 and 31 of the major insulation envelope in horizontally-folded position at the top of the pack assembly 16, and the horizontally spaced apart edges of the folded portions 30 and 31 define openings 33 and 34 at the top and bottom respectively of the major insulation envelope 23. The tank cover 11 is spaced vertically from the pack assembly 16 to provide an upper reservoir of liquid dielectric at the top of the casing 10 in communication with the opening 33 in the top of the major insulation envelope 23. Internal spacers 36 preferably of corrugated kraft paper, are positioned within the major insulation envelope between certain of the packs 14 to provide vertical channels 37 in communication with the upper reservoir for the upward flow of liquid dielectric 12 and thus facilitate transfer of heat from the heat source to the atmosphere. Elongated insulating spacers 39 and 40 are disposed between packs 14 and the folded-over side portions 30 and front and rear portions 31 respectively of the major insulation envelope sheets 24 to prevent the folded-over major insulation portions 30 and 31 from obstructing flow of liquid through the internal channels 37. Although the preferred embodiment has been illustrated and described as having the internal spacers 36 between packs 14, it will be appreciated that the invention also comprehends disposing the internal spacers within the individual packs 14.

Means are provided to hold the capacitor pack assembly 16 off the bottom wall 42 of the metallic tank 10 and thus provide a lower reservoir of liquid dielectric below the pack assembly 16 in communication with opening 34 and vertical channels 37. In the embodiment of FIG. 1 such means comprises an insulating member 43 preferably of approximately 1/16 inch thick paperboard material disposed against the bottom wall 42 at the interior of the tank and having a plurality of horizontally spaced apart raised embossments 44 therein which hold the pack assembly 16 above the tank bottom wall 42. Insulating member 43 has vertically extending side portions 46 disposed between the major insulation envelope 23 and the front and back walls 51 of tank 10 at the lower end of tank 10. Each side portion 46 has a plurality of openings 47 therethrough which permit circulation of the liquid dielectric 12 into and out of the lower reservoir at the bottom of tank 10.

Although some liquid flow may occur in capacitors of conventional construction, this flow is substantially entirely internal of the major insulation envelope and is so restricted that very little heat is removed from the capacitor packs. In accordance with the preferred embodiment of the invention cooling means are provided external of the major insulation envelope and isolated by the major insulation from the heat source to dissipate to the atmosphere the heat absorbed from the packs 14 by the liquid dielectric 12 and to return the cooled dielectric liquid to the lower reservoir. In the embodiment illustrated in FIG. 1 vertical embossments 49 are provided in the tank endwalls 50 and in the front and rear tank walls 51. The embossments 49 extend vertically above and below the capacitor packs 14 and, together with the major insulation envelope 23, define ducts 52 isolated from the heat source which allow dissipation of the heat to the atmosphere and the heated liquid dielectric to cool and return to the lower reservoir. The large heat dissipating area per unit volume of liquid flow provided by the embossments 49, together with the isolation of the hot liquid from the heat source by the major insulation 23, results in effective heat dissipation to the atmosphere.

The graph of FIG. 7 illustrates how the disclosed construction reduces the thermal gradient across the major insulation 23 in comparison to prior art constructions. This graph plots the temperature gradient from the middle pack 14 of the pack assembly 16 to the tank sidewall 51. Curve A is in accordance with conventional capacitor construction and curve B is for a capacitor in accordance with the invention identical in kilovar rating, voltage stress, and projected tank area to the capacitor of curve A. It will be noted that not only is the thermal gradient across the major insulation of the capacitor in accordance with the invention markedly reduced in comparison to that of the conventional construction but also that the dielectric and sidewall temperatures are also substantially reduced.

The graph of FIG. 8 illustrates the dependence of dielectric operating temperature on the tank radiating area and plots kilovars per square inch of tank surface area (in percent) versus (percent of) allowable dielectric temperature rise for the conventional construction (curve D) and for a capacitor embodying the invention (curve E). Assuming the allowable dielectric temperature rise and kilovars per square inch of tank area for the conventional construction to both be 100 percent, it will be noted that the kilovars per square inch of tank surface area for a capacitor embodying the invention is approximately 70 percent greater than the conventional construction for the same dielectric temperature rise.

These curves indicate that the kilovars per square inch of tanks surface areas of a capacitor embodying the invention may be increased without exceeding the allowable dielectric operating temperature, and curve C of FIG. 7 illustrates the thermal gradient across the major insulation envelope 23 of a capacitor embodying the invention having a kilovar rating 150 percenter greater than that of the capacitors A and B while the projected surface area remains approximately the same. It will be noted that even though the kilovar rating of the capacitor of curve C is 150 percent greater than of the conventional capacitor of curve A, the thermal gradient of the capacitor of curve C embodying the invention is less than that of the conventional capacitor of curve A and the dielectric temperature rise of the two are equal.

One hundred kilovar capacitors constructed in accordance with the invention are the only commercially acceptable capacitors of this kvar rating presently available which will meet the standard mounting dimension of 15⅝ inches for the 25 and 50 kilovar units established by the National Electrical Manufacturers Association, and this means that the capacitor of the invention is the only 100 kilovar capacitor available which can replace two 50 kilovar capacitors in the same rack. Further, the hot-spot temperature of 100 kilovar capacitors embodying the invention is no greater than that of 50 kilovar capacitors of conventional construction. The tank width of 100 kilovar capacitors embodying the invention is only 13½ inches in comparison to other commercially available 100 kilovar capacitors which are approximately 20 inches and 25 inches in width respectively. Further, 100 kilovar capacitors embodying the invention weigh only approximately 185 pounds in comparison to other commercially available 100 kilovar capacitors of conventional construction which presently weigh upwards of 260 pounds. The lighter weight and narrow casing of capacitors embodying the invention reduced the bending moment on the power pole and make the capacitors and racks easier for the linemen to handle and hoist.

The preferred embodiment of the invention illustrated in FIGS. 1–4 having vertical embossments 49 in the tank endwalls 50 and front and rear walls 51 can withstand higher internal pressure, and thus is easier to protect by fuses, than conventional capacitor construction. The tank having the vertical embossments 49 can bulge and withstand considerably greater expansion of gas, incident to an internal fault, without rupturing than a conventional flat-walled capacitor tank. The bulging of the tank allows the capacitor to carry fault current for a greater length of time before rupture than a conventional unit, and this permits use of higher rating fuses for protection of low kilovar capacitor banks in the 2400–7200 voltage range which will carry fault current for a greater length of time before rupture than the fuses used with prior art capacitors. The tank having the vertical embossments 49 permits use of conventional expulsion fuses on systems having high fault current and which require more expensive current limiting fuses for the protection of conventional capacitors.

FIG. 5 illustrates a further embodiment of the invention wherein the embossments are omitted from the casing and corrugated kraft paper spacers 55 disposed between the major insulation envelope 23 and the tank sidewalls 50 and the front and rear tank walls 51 define, together with the major insulation 23 and the tank walls, vertical ducts 56 external of the major insulator 23 and in contact with the heat dissipating tank area in which the heated liquid 12 from the upper reservoir can dissipate heat to the atmosphere and return to the lower reservoir.

FIG. 6 illustrates an alternative embodiment of the invention wherein the ducts exterior of the major insulation envelope 23 are provided by radiator tubes 60 registering with the interior of the tank 10 above and below the capacitor pack assembly 16 and permitting a small volume of liquid dielectric 12 isolated from the heat source to cool and return into the lower reservoir at the bottom of the tank.

FIG. 10 illustrates an alternative embodiment of the invention applicable to capacitors of 50 kilovar and lower ratings and having lower hot spot temperature and lower temperature gradient across the major insulation than conventional capacitor constructions even though no ducts are provided external to the major insulation envelope. The major insulation envelope 23 abuts directly against the tank front and rear walls 62 and endwalls 65 which may be flat as in conventional construction and do not have vertical embossments therein. Certain of the capacitor packs 14 are spaced apart by corrugated kraft paper internal spacers 36, one of which 36' is provided approximately at the center of the pack assembly 16, to provide vertical channels 37 within the major insulation envelope 23. The portons 30 of the major insulation sheets 24 which extend above and below the pack assembly 16 along the narrower sides thereof are folded over horizontally as shown in dotted lines in a manner identical to the embodiment of FIGS. 1–4, and the portions 31 of the sheets 24 which extend above and below the pack assembly 16 along the tank front and rear walls 62 are then folded horizontally over the portions 30 as shown in dotted lines in a manner identical to the embodiment of FIGS. 1–4 leaving openings 33 and 34 in the major insulation at the top and bottom of the pack assembly 16.

Elongated insulating spacers 39 and 40 are disposed between the packs 14 and the folded-over side portions 30 and front and rear portions 31 respectively of the major insulation envelope sheets 24 at the top and bottom of the pack assembly to prevent the folded-over portions 30 and 31 from obstructing flow of liquid dielectric through the internal vertical channels 37. An insulating member 63 of U-shaped cross section disposed exterior of the major insulation envelope 23 insulates the packs 14 from the bottom wall 64 and the front and rear walls 62 of the tank and rests upon a pair of spaced apart, elongated embossments 66 in the bottom tank wall 64. The insulating members 39 and 40 space the pack assembly 16 from the folded-over portions 30 and 31 of the major insulation envelope 23 to form liquid reservoirs above and below the pack assembly 16 in communication with the internal channels 37.

In conventional capacitor construction the pack at the center of the pack assembly has the highest hot spot temperature, and the hot spot temperature of the packs spaced away from the center pack decreases progressively towards the endwalls of the tank. A curve plotting hot spot temperature of the packs versus their position lengthwise of the conventional pack assembly is thus in the shape of an inverted-V. In the embodiment of FIG. 10 having internal ducts 37 within the major insulation envelope 23 but no cooling ducts exterior to the major insulation envelope, the hot spot temperature of the center packs 67 is not greater than that of other packs 14 spaced away therefrom toward the tank endwalls 65. A curve of pack hot spot temperature plotted against position of the packs within the pack assembly for the embodiment of FIG. 10 resembles a series of saw teeth with the peaks thereof considerably lower than that of the aforementioned inverted-V curve for conventional capacitor construction. The liquid dielectric circulating upward in the central vertical channel 37 formed by the one spacer 36' cools the packs 14 adjacent thereto at the center of the pack assembly 16 and the liquid dielectric returns to the lower liquid reservoir through the other vertical channels 37. The convection circulation of liquid dielectric through the channels 37 within the major insulation envelope thus reduces both the hot spot temperature and the thermal gradient across the major insulation in comparison to prior art construction, and this embodiment of the invention is applicable to capacitors of 50 kilovar and lower ratings.

While only a few embodiments of the invention have been illustrated and described, many modifications and variations thereof will be apparent to those skilled in the art, and consequently it is intended in the appended claims to cover all such modifications and variations which fall within the true spirit and scope of the invention.

What we claim is:

1. An electrical capacitor comprising, in combination, a hollow metallic casing, liquid dielectric within said casing, a plurality of flat capacitor packs disposed in side-by-side relation within said casing forming an assembly having generally rectangular sides and generally rectangular top and bottom surfaces, an envelope of insulation abutting snugly against the interior surface of all of the sidewalls of said casing and closely surrounding all of said rectangular sides of said assembly and insulating said packs from the walls of said casing, said envelope extending beyond said pack assembly at the upper and lower ends thereof and having said extending portions folded over to enclose sad top and bottom surfaces of said assembly, said folded portions being spaced apart horizontally and defining openings through said envelope at the upper and lower ends thereof, spacer means within said insulation envelope defining vertical channels within said assembly in heat exchange relation with relatively large surfaces of said packs generally parallel to the flat sides of said packs for the upward flow of said liquid dielectric in heat transfer relation with said packs, the sidewalls of said casing having vertically extending, outwardly projecting grooves therein defining, together with said insulation envelope, vertical ducts isolated from said packs and in communication with the openings at the top and bottom of said insulation envelope, said liquid dielectric flowing by convection in a path upwardly through said channels interior of said assembly and then downwardly through said ducts exterior of said envelope and dissipating to the atmosphere through the sidewalls of said casing the heat absorbed from said packs by said liquid dielectric in flowing through said channels.

2. An electrical capacitor comprising, in combination, a hollow metallic tank, liquid dielectric within said tank, a plurality of juxtaposed flat capacitor packs disposed within said tank forming an assembly having pairs of opposed sides and top and bottom surfaces, an insulation envelope closely surrounding all of said sides of said assembly and extending beyond said packs at the upper and lower ends thereof and isolating them from the walls of said tank, said extending portions of said envelope being folded over said top and bottom surfaces of said assembly and said folded over portions being spaced apart horizontally to define openings in the upper and lower ends of said envelope, said envelope being supported from the sidewalls of said tank and holding said pack assembly from all four sides in fixed position within said casing, whereby metallic members are not required between said packs and said tank sidewalls, said packs being spaced from the top wall of said tank to define an upper reservoir of liquid dielectric in communication with the opening at the upper end of said envelope, spacer means within said insulation envelope defining vertical channels within said pack assembly each of which is in heat exchange relation with a relatively large surface of at least one of said packs generally parallel to the flat sides of said packs for the upward flow of said dielectric in heat transfer relation with said packs, insulating means for raising said packs off the bottom wall of said tank and providing a lower reservoir of liquid dielectric at the bottom of said tank in communication with said opening in the lower end of said envelope and with said channels, and means exterior of said insulation envelope and isolated by said insulation envelope from the heat source formed by said packs for circulating fluid between said upper reservoir and said lower reservoir, said fluid circulating means having a large surface area exposed to the atmosphere.

3. An electrical capacitor comprising, in combination, a hollow metallic casing, liquid dielectric within said casing, a plurality of flat capacitor packs disposed in back-to-back relation within said casing, an envelope of insulation abutting snugly against the interior surface of all of the sidewalls of said casing and closely surrounding said packs and insulating them from said casing and being open at the top and bottom, spacer means within said insulation envelope defining vertical channels in heat exchange relation with relatively large surfaces of said packs generally parallel to the flat sides of said packs for the upward flow of liquid dielectric in heat transfer relation with said packs, means including an insulating member having horizontally spaced apart, vertically raised embossments thereon for raising said packs above the bottom wall of said casing and providing a lower liquid reservoir at the bottom of said casing in communication with the opening in the bottom of said envelope, the top wall of said casing being spaced from said packs to define an upper liquid reservoir above said packs in communication with the opening in the top of said envelope, the sidewalls of said casing having outwardly projecting, vertically extending embossments therein in communication with said upper and lower reservoirs and defining, together with said envelope of insulation, cooling ducts isolated from the heat generated in said packs for permitting cooling of said liquid dielectric, which was heated in passing upwardly thru said channels interior of said envelope, by heat dissipation to the atmosphere through the walls of said casing and the return of the cooled liquid dielectric to said lower reservoir by convection flow of said liquid dielectric.

4. An electrical capacitor comprising, in combination, a hollow metallic casing, liquid dielectric within said casing, a plurality of flat capacitor packs disposed in back-to-back relation within said casing, an envelope of insulation abutting snugly against the interior surface of all of the sidewalls of said casing and closely surrounding said packs and insulating them from said casing and being open at the top and bottom, spacer means within said insulation envelope defining vertical channels in heat exchange relation with relatively large surfaces of said packs generally parallel to the flat sides of said packs for the upward flow of liquid dielectric in heat transfer relation with said packs, the sidewalls of said casing having corrugations therein the ends of which are in commuication with the openings in the top and bottom of said insulation envelope and which, together with said insulation envelope, define cooling ducts isolated from the heat source formed by said packs and permitting heat dissipation to the atmosphere through the walls of said casing, said channels and said ducts permitting continuous convection flow of said liquid dielectric therethrough in heat transfer relation with said packs interior of said envelope and with the walls of said casing exterior of said envelope.

5. An electrical capacitor comprising, in combination, a hollow metallic casing, liquid dielectric within said casing, a plurality of flat, rolled-electrode capacitor packs disposed in back-to-back relation within said casing, a multi-ply envelope of insulation disposed in vertical planes surrounding said packs and extending vertically beyond the packs at the upper and lower ends thereof and having said extending portions folded horizontally to enclose said packs, said horizontally-folded portions being spaced apart and defining openings through said envelope at the upper and lower ends thereof, said packs surrounded by said envelope fitting snugly against the sidewalls of said casing, spacer means within said envelope defining vertical channels in heat exchange relation with relatively large surfaces of said packs generally parallel to the flat sides of said packs for the upward flow of said liquid dielectric in heat transfer relation with said packs, the sidewalls of said casing having vertical, outwardly projecting embossments therein extending beyond the folded-over portions of said envelope at the upper and lower ends of said packs and, together with said envelope, defining vertical ducts exterior of said envelope in communication with the openings at the upper and lower ends of said envelope for the convection flow of said liquid dielectric through said channels in heat exchange relation with said packs interior of said envelope and through said ducts exterior of said envelope.

6. An electrical capacitor comprising, in combination, a hollow metallic tank, liquid dielectric within said tank, a plurality of capacitor packs disposed in side-by-side relation within said tank forming an assembly having pairs of opposed sides and top and bottom surfaces, an insulation envelope closely surrounding all of said sides of said assembly and having openings at the upper and lower ends thereof, said insulation envelope being supported from the sidewalls of said tank and holding said pack assembly from all four sides in fixed position within said tank, whereby metallic elements are not required between said packs and the sidewalls of said tank, means for providing an upper reservoir of said liquid dielectric between the top wall of said tank and said packs in communication with the opening at the upper end of said envelope, means for providing a lower reservoir between the bottom wall of said tank and said packs in communication with the opening in the lower end of said assembly, spacer means within said envelope defining vertical channels in heat exchange relation with relatively large surfaces of said packs generally parallel to the sides of said packs and in communication with said upper and lower reservoirs for the upward flow of said liquid dielectric in heat transfer relation with said packs, and means exterior of said insulation envelope defined at least partially by the sidewalls of said tank for providing a plurality of vertical cooling ducts in communication with said upper and lower reservoirs, said cooling ducts having heat radiating surfaces exposed to the atmosphere and together with said channels providing continuous convection flow of said liquid dielectric in heat transfer relation with said packs in a path upwardly thru said channels interior of said assembly and then downwardly through said cooling ducts exterior of said envelope.

7. An electrical capacitor comprising, in combination, a hollow metallic casing, liquid dielectric within said casing, a plurality of flat capacitor packs disposed in side-by-side relation within said casing forming an assembly having pairs of opposed sides, an envelope of insulation abutting snugly against all of the sidewalls of said casing and closely surrounding all of said sides of said assembly and insulating said packs from the walls of said casing, said envelope being open at the top and bottom, said packs being spaced from the top and bottom walls of said casing to provide upper and lower reservoirs of liquid dielectric at the top and bottom of said tank, spacer means within said envelope defining vertical channels within said pack assembly in communication with said upper and lower reservoirs and in heat exchange relationship with relatively large surfaces of said packs generally parallel to the flat sides of said packs for the upward flow of said liquid dielectric in heat transfer relation with said packs, at least one of said spacer means being disposed approximately at the center of said side-by-side packs said liquid dielectric flowing by convection upwardly thru the channel defined by said one spacer means and downwardly thru said other channels and also flowing thru the openings in the top and bottom of said envelope to conduct heat to the walls of said metallic casing, whereby the hot-spot temperature and the thermal gradient across said insulation envelope is reduced.

8. An electrical capacitor comprising, in combination, a hollow metallic casing, liquid dielectric within said casing, a plurality of flat capacitor packs disposed in side-by-side relation within said casing forming an assembly having pairs of opposed sides and top and bottom surfaces, an envelope of insulation abutting snugly against all of the sidewalls of said casing and closely surrounding all of said sides of said assembly and having horizontally folded-over portions above and below said top and bottom surfaces of said assembly, said envelope insulating said packs from the walls of said casing and being open at the top and bottom, said packs being spaced from the top and bottom walls of said casing to provide upper and lower reservoirs of liquid dielectric, spacer means within said envelope defining vertical channels within said pack assembly in communication with said upper and lower reservoirs and in heat exchange relation with relatively large capacitor pack surfaces generally parallel to the flat sides of said packs for the upward flow of said liquid dielectric in heat transfer relation with said packs, at least one of said spacer means being disposed approximately at the center of said plurality of side-by-side packs, and a plurality of insulating spacer elements disposed between said packs and the folded-over portions of said insulation envelope to prevent obstruction of said vertical channels, said liquid dielectric flowing upwardly by convection thru the channel defined by said one spacer means and then downwardly thru the other of said channels and also flowing thru the openings in the top and bottom of said envelope and conducting heat to the walls of said metallic casing, whereby the hotspot temperature of said packs and the thermal gradient across said insulation envelope is reduced.

9. An electrical capacitor comprising, in combination, a hollow metallic tank, liquid dielectric within said tank, a plurality of juxtaposed capacitor packs disposed within said tank forming an assembly having pairs on opposed sides, an insulation envelope fitting snugly against all of the sidewalls of said tank and closely surrounding all of said sides of said assembly and insulating said packs from the walls of said tank, said envelope being open at the upper and lower ends thereof, said packs being spaced from the top wall of said tank to define an upper reservoir of liquid dielectric in communication with the opening at the upper end of said envelope, spacer means within said insulation envelope between certain of said packs defining vertical channels between packs for the upward flow of said dielectric in heat transfer relation with said packs, insulating means for raising said packs off the bottom wall of said tank and providing a lower reservoir of liquid dielectric at the bottom of said tank in communication with said opening in the lower end of said envelope and with said channels, and a plurality of vertical metallic cooling tubes spaced from said tank and secured to at least one sidewall of said tank adjacent the upper and lower ends thereof and communicating with the interior of said tank and with said upper and lower reservoirs.

10. An electrical capacitor comprising, in combination, a hollow metallic casing, liquid dielectric within said casing, a plurality of flat capacitor packs disposed in side-by-side relation within said casing forming an assembly having pairs of opposed sides and top and bottom surfaces, an envelope of insulation closely surrounding all of said sides of assembly and insulating said packs from the walls of said casing, said envelope extending beyond said pack assembly at the upper and lower ends thereof and said extending portions being folded over to enclose said top and bottom surfaces, said folded over portions being spaced apart horizontally defining openings through said envelope at the top and bottom, said packs being spaced from the top and bottom of said casing to provide upper and lower reservoirs of liquid dielectric in communication with the openings at the top and bottom of said insulation envelope, first spacer means within said insulation envelope defining vertical channels within said assembly in communication with said upper and lower reservoirs and in heat exchange relation with relatively large surfaces of said packs generally parallel to the flat sides of said packs for the upward flow of liquid dielectric in heat transfer relation with said packs, and second insulating spacer means disposed between said insulation envelope and the sidewalls of said tank defining vertical ducts for the circulation of said liquid dielectric between said upper and lower reservoirs exterior of said insulation envelope, said liquid dielectric flowing upwardly by convection thru said channels within said assembly and thence downwardly through said ducts exterior of said envelope, said second insulating spacer means supporting said pack assembly from the sidewalls of said casing, said pack assembly being held from all four sides in fixed position within said casing.

References Cited in the file of this patent

UNITED STATES PATENTS

| 1,511,935 | Bayles | Oct. 14, 1924 |
| 2,162,475 | Brooks | June 13, 1939 |

FOREIGN PATENTS

| 376,965 | Great Britain | July 21, 1932 |